US008564621B2

(12) United States Patent
Branson et al.

(10) Patent No.: US 8,564,621 B2
(45) Date of Patent: Oct. 22, 2013

(54) REPLICATING CHANGES BETWEEN CORRESPONDING OBJECTS

(75) Inventors: Michael J. Branson, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 12/854,417

(22) Filed: Aug. 11, 2010

(65) Prior Publication Data

US 2012/0038667 A1 Feb. 16, 2012

(51) Int. Cl.
G09G 5/00 (2006.01)
G06Q 10/00 (2012.01)
G06F 21/00 (2013.01)
G06F 3/00 (2006.01)

(52) U.S. Cl.
USPC .......... 345/632; 345/629; 345/630; 345/631; 705/28; 705/57; 705/58; 705/59; 715/741; 715/742; 715/743

(58) Field of Classification Search
USPC ............... 345/419, 629–632; 705/26.1–26.9, 705/27.1–27.2, 28, 51–59, 76–78, 705/901–912; 713/168–171, 189–190, 713/155–159; 715/733, 835, 740–743; 726/26–33, 5–10

See application file for complete search history.

(56) References Cited

U.S. PATENT DOCUMENTS

| | | | |
|---|---|---|---|
| 6,772,195 B1 * | 8/2004 | Hatlelid et al. ............... 709/204 |
| 6,784,901 B1 * | 8/2004 | Harvey et al. .................. 715/757 |
| 6,944,761 B2 * | 9/2005 | Wood et al. .................... 713/155 |
| 7,721,307 B2 * | 5/2010 | Hendricks et al. .............. 725/34 |
| 8,433,656 B1 * | 4/2013 | Evans et al. ...................... 705/59 |
| 2007/0100768 A1 * | 5/2007 | Boccon-Gibod et al. ....... 705/59 |
| 2007/0211047 A1 * | 9/2007 | Doan et al. ..................... 345/419 |
| 2007/0255807 A1 * | 11/2007 | Hayashi et al. ............... 709/219 |
| 2008/0059570 A1 * | 3/2008 | Bill ................ 709/203 |
| 2008/0066181 A1 * | 3/2008 | Haveson et al. ................ 726/26 |
| 2008/0215994 A1 * | 9/2008 | Harrison et al. .............. 715/757 |
| 2008/0222295 A1 * | 9/2008 | Robinson et al. ............. 709/227 |
| 2008/0263458 A1 * | 10/2008 | Altberg et al. ................ 715/757 |
| 2008/0282090 A1 * | 11/2008 | Leybovich ..................... 713/182 |
| 2009/0106847 A1 * | 4/2009 | Krupman et al. ............... 726/26 |
| 2009/0113314 A1 * | 4/2009 | Dawson et al. ............... 715/757 |
| 2009/0119764 A1 * | 5/2009 | Applewhite et al. ............. 726/9 |
| 2009/0125481 A1 * | 5/2009 | Mendes da Costa et al. ..... 707/3 |
| 2009/0132361 A1 * | 5/2009 | Titus et al. ...................... 705/14 |
| 2009/0138402 A1 * | 5/2009 | Chan et al. ...................... 705/51 |
| 2009/0150802 A1 * | 6/2009 | Do et al. ........................ 715/757 |
| 2009/0158210 A1 * | 6/2009 | Cheng et al. .................. 715/810 |
| 2009/0172557 A1 * | 7/2009 | Muta ............................. 715/740 |
| 2009/0177977 A1 * | 7/2009 | Jones et al. .................... 715/753 |
| 2009/0271436 A1 * | 10/2009 | Reisinger .................. 707/103 Y |
| 2009/0300525 A1 * | 12/2009 | Jolliff et al. .................. 715/764 |
| 2009/0313556 A1 * | 12/2009 | Hamilton et al. ............. 715/757 |
| 2010/0070859 A1 * | 3/2010 | Shuster et al. ................ 715/706 |
| 2010/0121763 A1 * | 5/2010 | Vasudevan et al. ............. 705/39 |

* cited by examiner

*Primary Examiner* — Aaron M Richer
*Assistant Examiner* — Michael J Cobb
(74) *Attorney, Agent, or Firm* — Patterson & Sheridan, LLP

(57) ABSTRACT

Embodiments of the invention generally relate to replicating changes between corresponding real objects and virtual objects in a virtual world. Embodiments of the invention may include receiving a request to generate a virtual item in a virtual world based on a real-world object, generating the virtual item, synchronizing the virtual item and real-world object, and sharing the virtual item with a second avatar in the virtual world.

20 Claims, 10 Drawing Sheets

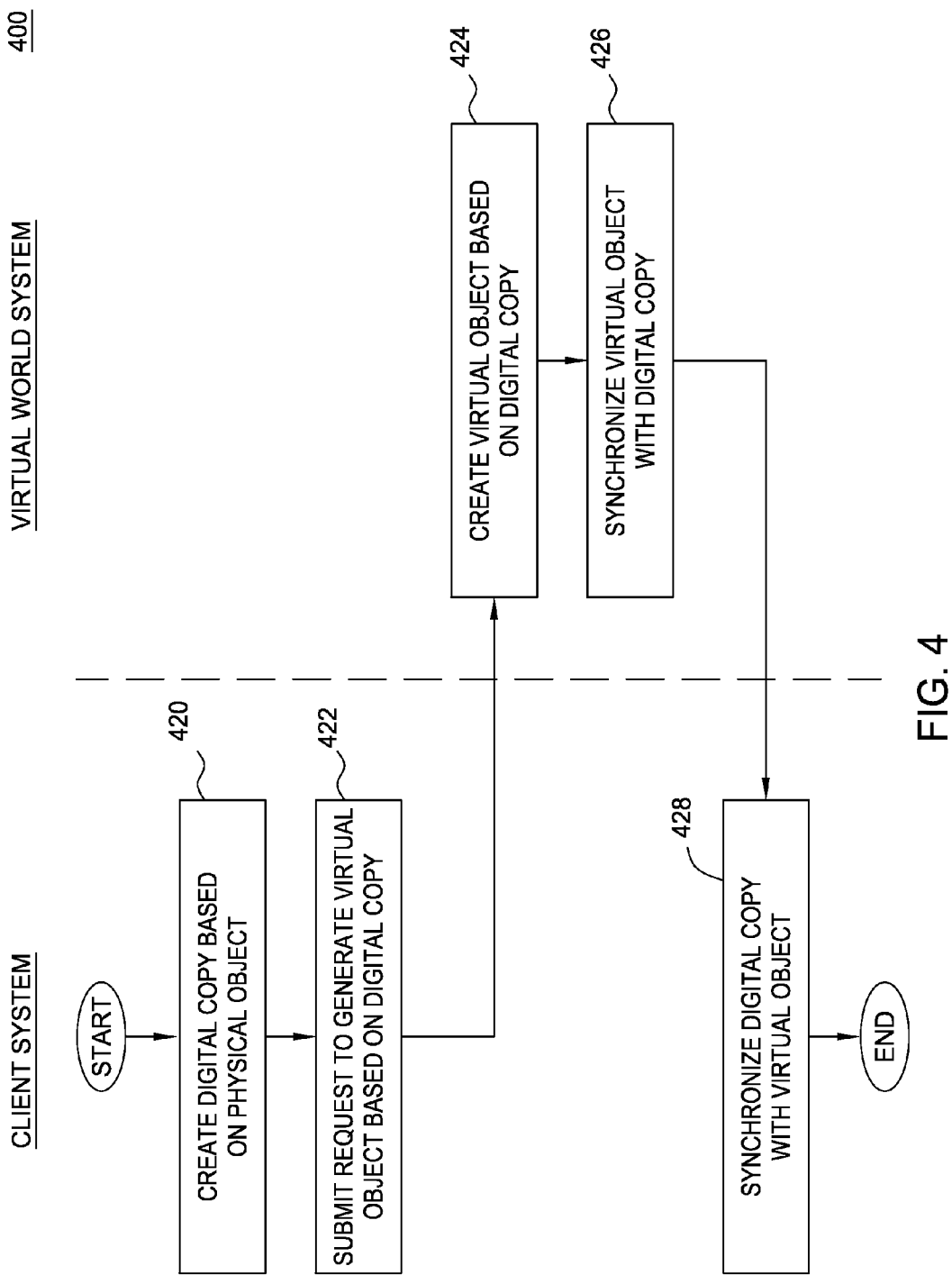

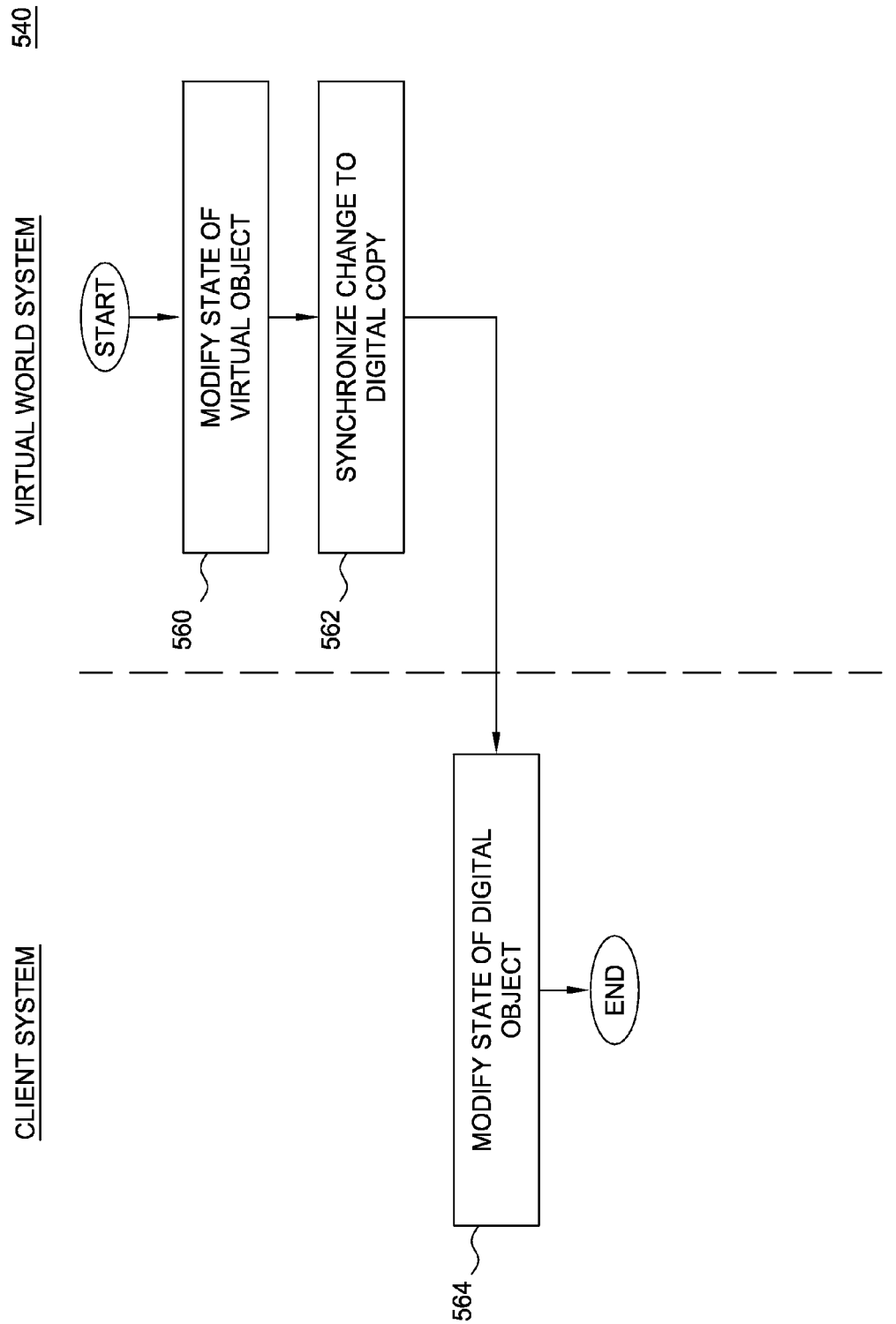

REPLICATING CHANGES BETWEEN CORRESPONDING OBJECTS

BACKGROUND

Embodiments of the invention relate to communicating changes between virtual and real (i.e., physical or real-world) objects.

A virtual world is a simulated environment which may be inhabited by users. The users may interact with virtual objects and locations throughout the virtual world. Users may also interact with one another via avatars. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another.

Virtual worlds are said to provide an immersive environment, as they typically appear similar to the real world. Virtual environments, complete with avatars and virtual items, are typically presented as images on a display screen. Furthermore, objects in the virtual world tend to follow rules related to gravity, topography, locomotion, physics and kinematics. Of course, virtual worlds can suspend or alter these rules as well as provide other imaginative or fanciful environments. Current techniques exist for creating a virtual replica of a real-world item (e.g., an item in digital or physical form existing in the real world, and existing outside the virtual world). However, while such virtual replicas may share the appearance of the real-world item, these replicas often do not contain all the content of the physical item. Furthermore, such replicas are not synchronized with their corresponding real-world counterpart to reflect changes made to the real-world item.

SUMMARY

Embodiments of the invention provide a computer-implemented method, computer program product, and system to communicate content. The computer-implemented method, computer program product, and system include creating a virtual object in a virtual world, based on a real-world object existing outside the virtual world. The computer-implemented method, computer program product, and system further include synchronizing the virtual object with the real-world object such that changes to one of the objects are reflected in the other object. Additionally, the computer-implemented method, computer program product, and system include associating the virtual object with a first avatar in the virtual world.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 is a flow diagram illustrating a method of synchronizing a physical item with a virtual item, according to one embodiment of the invention.

FIGS. 5A-5B are flow diagrams illustrating methods of synchronizing a physical item and a virtual item, according to embodiments of the invention.

DETAILED DESCRIPTION

Figure 1A:
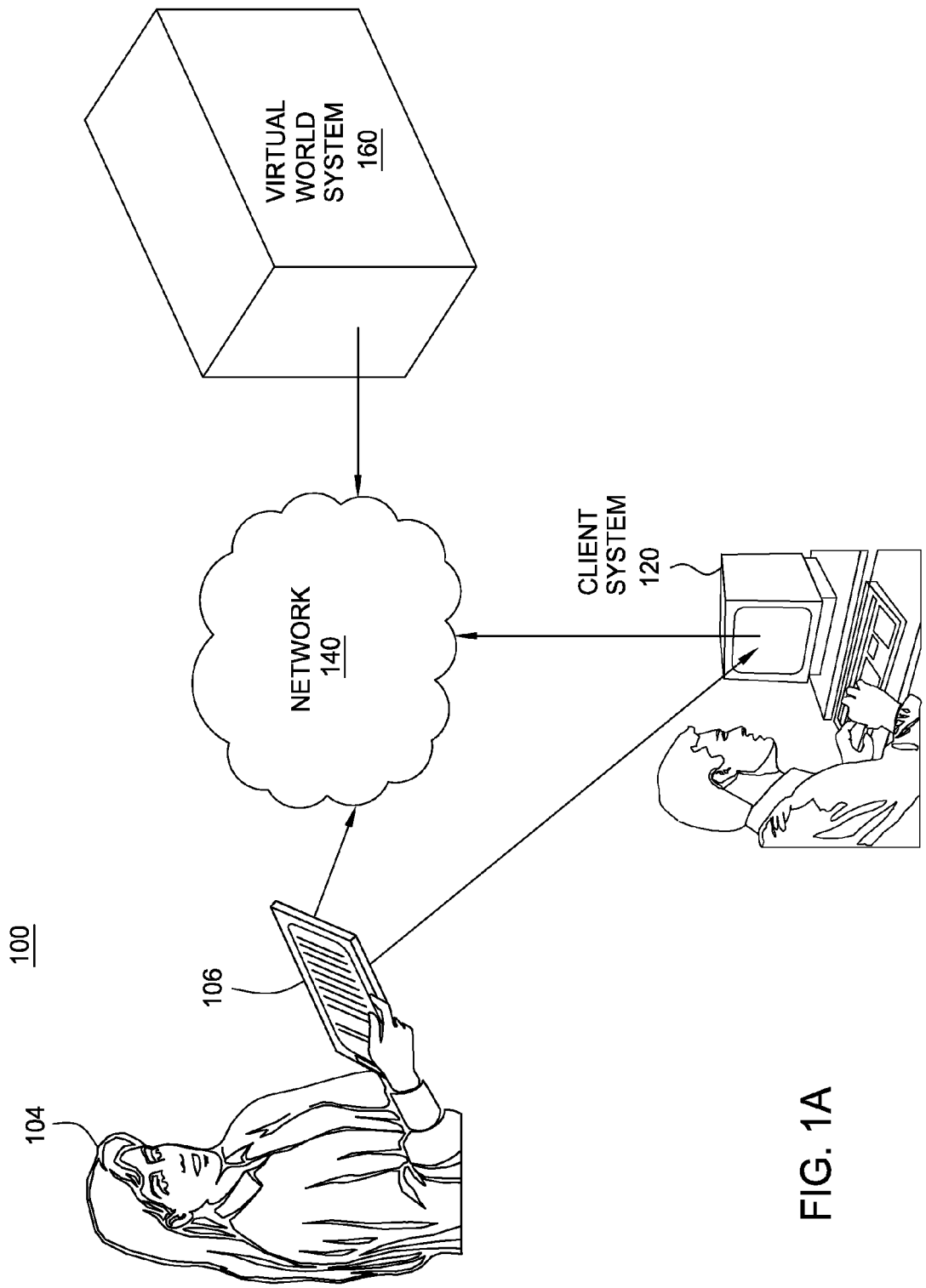
FIGS. 1A-1B are block diagrams of a networked computer system configured to replicate changes between corresponding virtual objects and real objects, according to embodiments of the invention.

Embodiments of the invention may receive a request to create a virtual item in a virtual world, based on a real-world item. The created virtual item can then be synchronized with the real-world item. The synchronization may be unidirectional or bidirectional. Embodiments of the invention may then associate the virtual item with a first avatar in the virtual world. A user may then share the virtual item with other avatars in the virtual world (e.g., other users).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the virtual world) or related data available in the cloud. For example, the virtual world server application could execute on a computing system in the cloud and accept requests from users to access the virtual world. In such a case, the virtual world server application could receive a copy of a real-world object and store the copy as a virtual object at a storage location in the cloud. The virtual world server application could then communicate with the virtual world client to synchronize the real-world object with the virtual object. Doing so allows a user to access and share an updated copy of the virtual item from any computing system attached to a network connected to the cloud (e.g., the Internet).

Figure 1B:
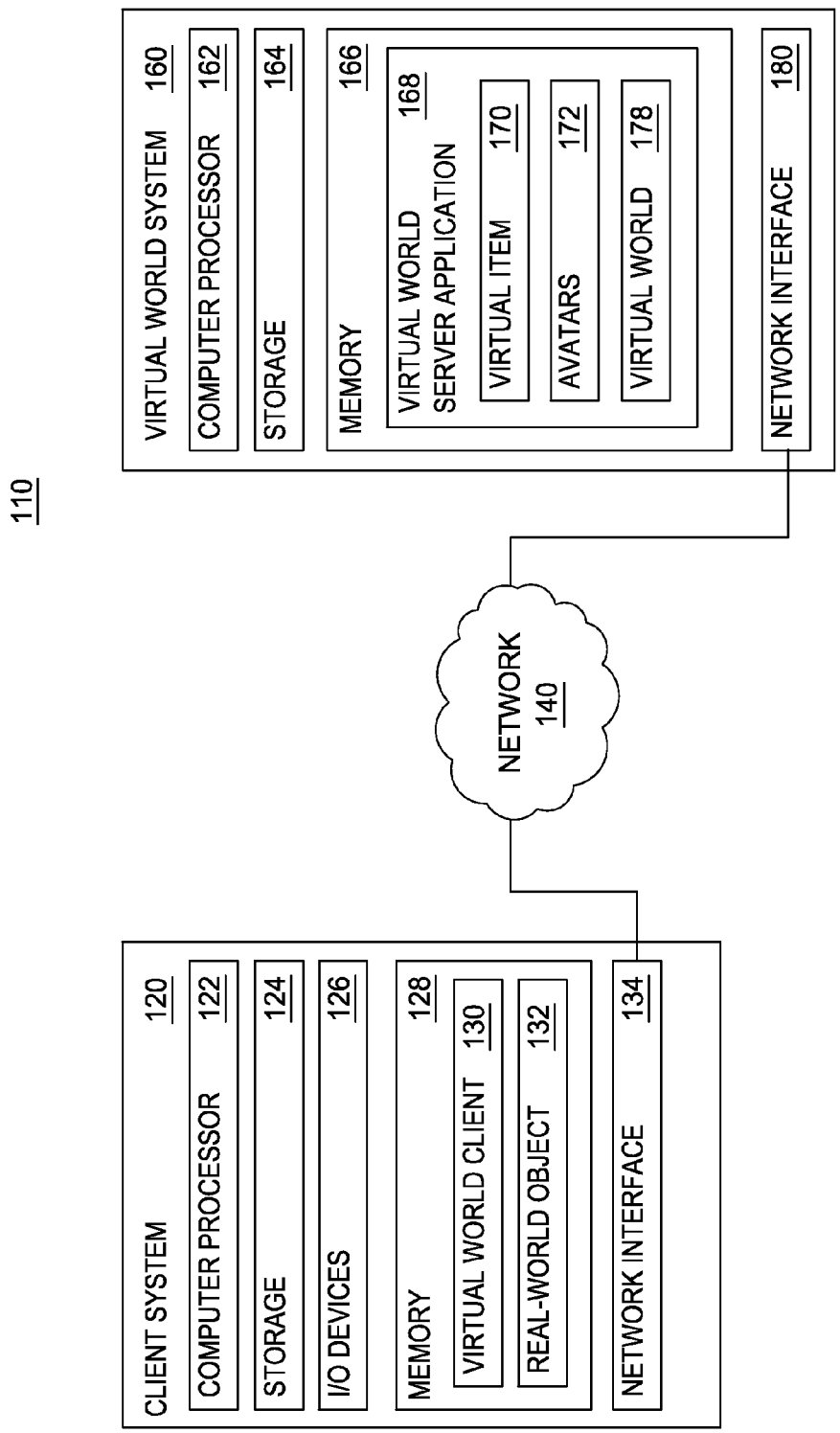

Referring now to FIGS. 1A-1B, FIGS. 1A-1B are block diagrams of a networked computer system configured to replicate changes between corresponding virtual objects and real objects, according to embodiments of the invention. More specifically, FIG. 1A is a block diagram of a networked system configured to replicate changes between an eBook reader and a virtual object in a virtual world, according to one embodiment of the invention. As shown, the system 100 includes a client system 120, a network 140, and a virtual world system 160. The client system 120 may include a virtual world client application and the virtual world system 160 may include a virtual world server application. The virtual world client on the client system 120 may connect to the virtual world server on the virtual world system 160 using the network 140. Upon establishing a connection, the client may display a visual representation of the virtual world, including any avatars, items and any interactions therebetween occurring in the virtual world.

Additionally, FIG. 1A includes a user 104. As shown, the user 104 is using an eBook reader 106. In one embodiment of the invention, the user 104 may use the client system 120 to create a virtual item in the virtual world running on the virtual world system 160 that is a copy of the physical eBook reader 106. In one embodiment, the virtual item may take a different form than the associated physical item. For example, while the physical item may be the eBook reader 106, the virtual item may appear as a book. The user 104 may further associate the virtual item with an avatar controlled by the user 104. Furthermore, embodiments of the invention may synchronize the virtual item with the real-world eBook reader 106, such that the virtual item in the virtual world may reflect any changes to the physical eBook reader 106 existing in the real world. For example, if the user 104 turns the pages of a book being displayed on the eBook reader 106, the eBook reader 106 may synchronize this page change with an application on the client system 120. In this example, the eBook reader 106 may communicate the page turn to the client system 120 either directly (e.g., a Bluetooth connection) or indirectly using the network 140.

Upon receiving the state change information (i.e., the page turn) from the eBook reader 106, the client system 120 may replicate this change with the virtual world system 160 using the network 140. The virtual world server may then update the virtual item in the virtual world to reflect the page turn. As such, if the user 104 then uses the virtual client on the client system 120 to view the virtual item, the virtual item will display the same page of the book as the physical eBook reader 106. Furthermore, in one embodiment, if the user 104 then turns the page of the virtual item in the virtual world, the page turn may be replicated to the physical eBook reader 106, such that the eBook reader 106 will also display the next page of the book as well. As an example, in an embodiment where the real-world item and virtual item take on different appearances, the user 104 may push a button to change pages on the eBook reader 106. However, in this example, when the state change is replicated to the virtual item, the action may be displayed as the user's avatar turning the page of the virtual book.

The user 104 may share the virtual item with other avatars in the virtual world and allow the other users to preview the synchronized content. For example, assume the user's 104 avatar is sitting in a virtual park, reading from the virtual eBook reader. If a second avatar then walks by, the second avatar may look over the shoulder of the user's avatar and see what book the avatar (and accordingly the user 104) is reading. Furthermore, in one embodiment, the second avatar may see what page of the book the user is currently on, and may even view the content of that page. If the user 104 then turns the page of the physical eBook reader 106, the action may be synchronized to the virtual world, such that the second avatar will then see the user's avatar turn the page in the virtual eBook reader.

Additionally, the user 104 may lend the virtual item to other users, much the way a physical item can be lent out. For example, the user 104 may lend the virtual eBook reader to a second user's avatar in the virtual world. The second user may then use the virtual eBook reader to read the book contained on the virtual eBook reader. In some embodiments, the client system 120 may disable the user's 104 access to the book on physical eBook reader 106 (and to the virtual item) while the second user's avatar has control over the virtual item. The client system 120 may allow the user to, as a failsafe, retrieve the virtual item from the second avatar, and return the virtual item to the user's 104 avatar. As such, if the eBook reader 106 (or the specific book on the eBook reader 106) was disabled when the user 104 loaned the virtual item to the second user, the client system 120 may re-enable the eBook reader 106 or the book once the virtual item is retrieved.

In one embodiment of the invention, the physical item and the virtual item may be synchronized either in real-time or periodically. In an alternate embodiment, the physical item and the virtual item may also be synchronized in response to certain events. For example, if the user 104 loans the virtual book to the second user's avatar, if the user 104 then opens the same book in the eBook reader. Embodiments of the invention may then synchronize the book on the eBook reader with the virtual book loaned to the second user, and display the current page the second user is on in the virtual book on the physical eBook reader 106. By doing this, the user 104 may keep track of the second user's position in the book, while minimizing the amount of synchronization that occurs.

Furthermore, although FIG. 1A shows a virtual item created based on a physical eBook reader 106, different physical objects may be used in conjunction with embodiments of the invention. For example, a physical book may be used to create a virtual object. In one embodiment of the invention, the International Standard Book Number (ISBN) associated with the physical book may be used to look-up the contents of the physical book. These contents may then be used to create the virtual item, such that the contents of the book are then viewable using the virtual item in the virtual world. In an alternate embodiment, a video capture device (e.g., a webcam) may be used to capture the contents of the physical book, and these contents may be replicated to the virtual item in the virtual world. For example, if the user wishes to share a particular page of the physical book with a friend's avatar, the user may position the physical book in front of the webcam and turn to the page the user wishes to share. Embodiments of the invention may then capture the contents of the current page of the book (e.g., using the webcam) and replicate the capture content to the virtual item, whereupon the captured content may be shared with the friend's avatar using the virtual item. This is advantageous, particular when dealing with content protected by a third party's intellectual property rights, because this allows embodiments of the invention to verify that the user has possession of the physical copy of the book, and that the book is not being used more than once at the same time. Of course, one of ordinary skill in the art will recognize that other physical items besides books may be used in accordance with embodiments of the invention. Furthermore, while numerous examples of physical objects are given for illustrative purposes, generally any physical object capable of performing the functions described herein may be used.

FIG. 1B is a block diagram of a networked system configured to replicate changes between a virtual object and a real object, according to one embodiment of the invention. As shown, the system 110 includes a client system 120 and a virtual world system 160, both connected to the network 140. The client system 120 contains a computer processor 122, storage media 124, I/O devices 126, memory 128 and a network interface 134. Computer processor 122 may be any processor capable of performing the functions described herein. I/O devices 126 may represent a variety of input and output devices, including keyboards, mice, visual displays, printers and so on. The client system 120 may connect to the network 140 using the network interface 134. Furthermore, as will be understood by one of ordinary skill in the art, any computer system capable of performing the functions described herein may be used.

In the pictured embodiment, memory 128 contains a virtual world client 130 and an object 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The virtual world client 130 may generally connect to a virtual world server. Once connected to the server, the virtual world client 130 may output a representation of the virtual world for display (e.g., using an I/O device 126, such as a monitor). The real-world object 132 in this embodiment may be any digital media existing outside the virtual world. For instance, exemplary objects 132 include digital audio, documents, pictures, movies, etc. Although the object 132 is shown as contained in memory 128, one of ordinary skill in the art will recognize that the object 132 may be stored in other locations as well (e.g., storage 124), both on and off the client system 120. Furthermore, as discussed above, the digital object 132 may be associated with a physical object, such as the eBook reader 106.

The virtual world system 160 contains a computer processor 162, storage media 164, memory 166 and a network interface 180. Computer processor 162 may be any processor capable of performing the functions described herein. The virtual world system 160 may connect to the network 140 using the network interface 180. Furthermore, as will be understood by one of ordinary skill in the art, any computer system capable of performing the functions described herein may be used. Additionally, although memory 166 is shown as a single entity, memory 166 may include one or more memory devices having blocks of memory associated with physical addresses, such as random access memory (RAM), read only memory (ROM), flash memory or other types of volatile and/or non-volatile memory.

In the pictured embodiment, memory 166 contains a virtual world server application 168. The server application 168 contains a virtual item 170, avatars 172 and a virtual world 178. The virtual items 170 represent any items that may populate the virtual world. According to one embodiment of the invention, a virtual item 170 may be created based on a real-world object 132. The avatars 172 represent a user's persona in the virtual world. While avatars 172 are often created to take a humanoid shape, this is not always the case. The avatars 172 may be created in any shape or form capable of performing the functions described herein. Furthermore, although the virtual item 170, avatars 172 and virtual world 178 are shown as contained in memory 166, they may reside elsewhere on the virtual world system 160 (e.g., storage media 164) or on another system.

Generally, the virtual world server application 168 may manage the virtual world 178. For example, the virtual world server application 168 may accept a connection from a user (e.g., using network 140 and network interface 180). The virtual world server application 168 may associate the user with an avatar 172 (e.g., based on the user's authentication credentials). For example, upon logging into an account with the virtual world server application 168 through the virtual world client 130, the user may be associated with the first avatar 172 based on the user's account information. In another embodiment, the avatar 172 for the user may be received from the user's virtual world client 130. In yet another embodiment, the user may create the avatar 172 upon connecting to the server application 168 through the client 130.

Once the connection is established, the user's virtual world client 130 may display a representation of the virtual world 178 (e.g., using an I/O device 126, such as a monitor). The representation may be influenced by the user's avatar's 172 current location in the virtual world 178. Such a representation may include the terrain of the virtual world 178, as well as any virtual items 170 and other avatars 172 existing in the virtual world 178. For example, if the user's avatar and a second avatar are in the same location in the virtual world 178, the virtual world client 130 may display the second avatar to the user.

The user may create a virtual item 170 based on a real-world object 132. The virtual item 170 may contain all or part of the content of the real-world object 132. For example, if the user creates a virtual item 170 based on an eBook reader containing a particular book, the virtual item 170 may contain all or part of the content of the book. In one embodiment, the virtual item 170 may be a replica of the real-world item 132. In another embodiment, the virtual item 170 may take an alternate form of the real-world item 132. For example, while the real-world item 132 may be an eBook reader, the virtual item 170 may take the form of a normal book.

Figure 2A:
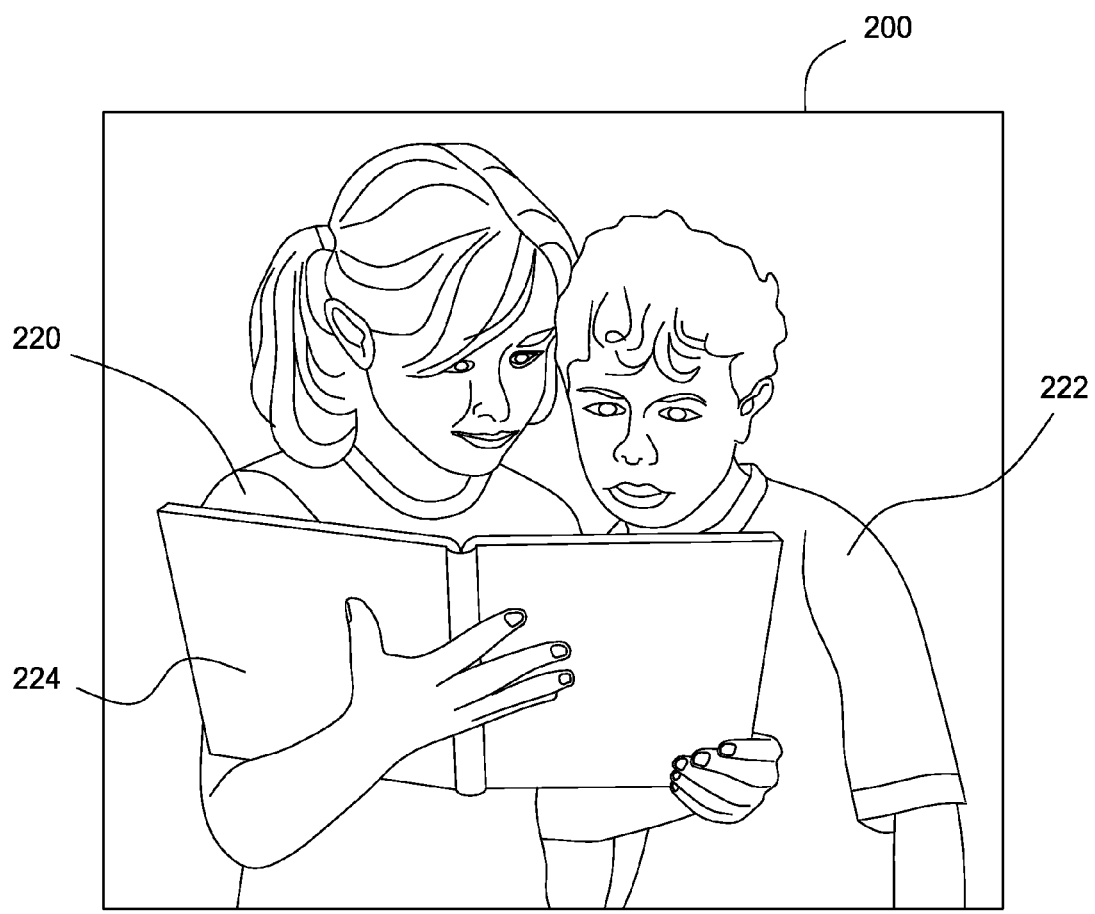
FIGS. 2A-2C are exemplary screenshots of virtual items in a virtual world, according to embodiments of the invention.
Figure 2B:
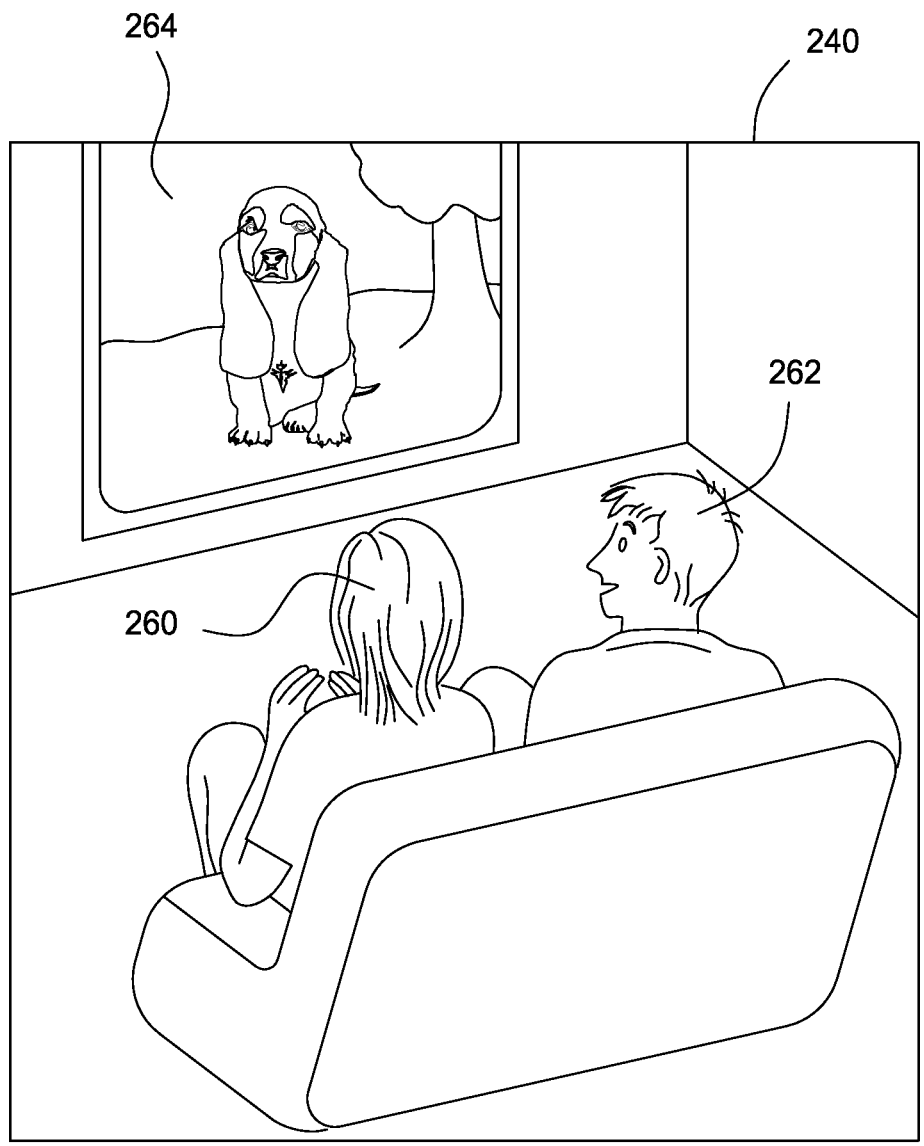
Figure 2C:
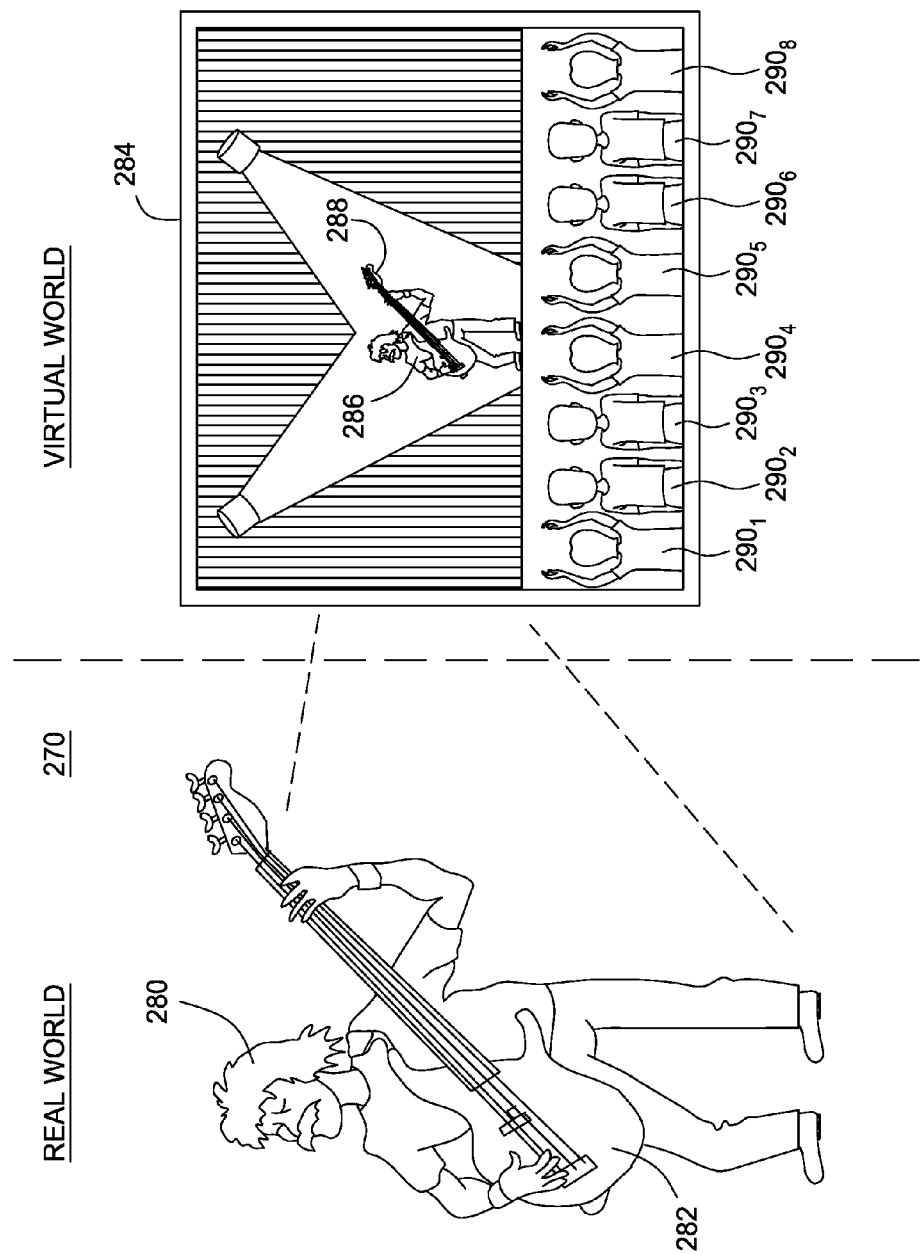

FIGS. 2A-2C are exemplary screenshots of virtual items in a virtual world, according to embodiments of the invention. FIG. 2A is an exemplary screenshot of two avatars sharing a virtual item in a virtual world, according to one embodiment of the invention. As shown, the screenshot 200 contains a first avatar 220 and a second avatar 222 sharing a virtual object 224. In the pictured example, the user associated with the first avatar 220 may have created the virtual item 224 based on a real-world object (e.g., the eBook reader 106). The user may then read the virtual book 224 using the first avatar 220. Furthermore, as discussed above, the virtual book 224 may be synchronized with the real-world object. Thus, for example, if the user turns the page on the eBook reader 106, the first avatar 220 may turn the page of the virtual book 224.

In addition, the user may use the first avatar 220 to share the virtual item 224 with a second avatar 222 in the virtual world 178. By sharing the virtual book 224 with the second avatar 222, the user controlling the first avatar 220 may effectively allow the second user controlling the second avatar 222 to preview the content of the book. Additionally, the user controlling second avatar 222 may determine not only what book the first user is reading, but what page of the book 224 the first user is on and may view the content of that page. Thus, for example, if the first user wishes to show the second user a particular passage of a book the first user is reading using the eBook reader, the first user may share this passage in the virtual world 178 by creating and sharing the virtual book 224 with the second user. As a second example, the user controlling the second avatar 222 may simply look over the shoulder of the first avatar 220 in the virtual world 178 to see what book 224 the first avatar 220 is reading.

FIG. 2B is an exemplary screenshot of two avatars sharing a virtual item in a virtual world, according to one embodiment of the invention. The screenshot 240 shows two avatars 172 in a virtual world 178: a first avatar 260 and a second avatar 262. In this example, a first user associated with the first avatar 260 may create a virtual home video 264 (i.e., a virtual item 170) based on a home video existing outside the virtual world 178. As discussed above, the virtual world server application 168 may be configured to synchronize the virtual item 170 with the physical object using the client application 130. Thus, for example, if the first user is watching the home video outside the virtual world (e.g., on a physical television), this action may be reflected in the virtual world, such that the user's avatar 260 may be shown as watching the virtual item 264 in the virtual world. Furthermore, the virtual item 170 in the virtual world 178 may reflect the current position of the home video the user is watching.

The user may further share the virtual item 264 with other users through their avatars in the virtual world. Thus, for example, a second user controlling a second avatar 262 may view the virtual item 264 to determine what the first user is watching outside the virtual world 178. In one embodiment, the virtual item 264 includes the entirety of the content of the real-world item. Thus, in the pictured example, the virtual item 264 may include the entirety of the home video the first user is watching. As such, the second user controlling the second avatar 262 may effectively watch the first user's home video by watching the virtual item 264.

In one embodiment, the second user may be required to get the permission of the first user (e.g., by using the second avatar 262 to ask the first avatar 260 for permission in the virtual world 178) before the second user may view the virtual video 264. In another embodiment, the first user (through the first avatar 260) may lend the virtual item 264 to the second user (through the second avatar 262). As such, the second user may then watch the virtual item in the virtual world 178 at a later time. In one embodiment where the content is protected by a third party's intellectual property rights (e.g., where a virtual item is created based on copyrighted content), the virtual world server application 168 may be configured to only allow the second user to preview a portion of the content 264 through the second avatar 262. In another embodiment where the virtual item 264 is protected by a third party's intellectual property rights, if the first avatar 260 lends the virtual item 264 to the second avatar 262, the first avatar 260 may be prevented from viewing the content of the virtual item 264 so long as the second avatar 262 has possession of it. The virtual world client 130 may further disable the first user's access to the real-world object 132 while the second avatar 262 has possession of the virtual item 264.

FIG. 2C is an exemplary diagram of a real-world object synchronized with a virtual item in a virtual world, according to one embodiment of the invention. The diagram 270 shows a user 280 playing a physical guitar 282. Additionally, the diagram shows a screenshot 284 of a virtual world, where the user's 280 avatar 286 is playing a virtual guitar 288. Furthermore, the screenshot 284 shows a plurality of other avatars 290 watching the performance. For example, the avatar $290_1$ may be controlled by a first user, avatar $290_2$ controlled by a second user, etc.

In the pictured example, the user 280 may have created a virtual guitar 288 based on the physical guitar 282. The user 280 may have further associated the virtual item 288 with the user's avatar 286. The virtual guitar 288 and physical guitar 282 may be synchronized (e.g., using the virtual world server application 168 and the virtual world client 130), such that when the user 280 plays notes on the physical guitar 282, the user's avatar 286 may also play the same notes on the virtual guitar 288 in the virtual world 178. As such, the user 280 (through the avatar 286) may share the music played using the physical guitar 282 with other users (through their avatars 290). Additionally, as discussed above, while the virtual guitar 170 may be based on and synchronized with the real-world guitar 282, the virtual guitar 170 need not be identical to the real guitar 282. For instance, the virtual guitar 170 may have a different appearance or make a different sound from the real-world guitar 282.

Furthermore, certain devices may be capable of further integrating into the virtual world. For example, a physical keyboard may be equipped with a MIDI device, which is capable of sending a digital output and receiving digital input. As discussed above, according to embodiments of the invention, a virtual keyboard may be created based on the physical keyboard. Once the virtual keyboard is created, a first user may loan the virtual keyboard to a friend's avatar. If the friend's avatar then plays the virtual keyboard in the virtual world, embodiments of the invention may synchronize the keys played in the virtual world with the physical device. As such, the physical device may react to the keys played on the virtual keyboard, and play the corresponding sound. Additionally, in one embodiment of the invention, the sound played by the physical keyboard may be replicated back to the virtual keyboard, such that when the friend's avatar plays the virtual keyboard, the virtual keyboard will produce the same sound as the physical keyboard. Of course, one of ordinary skill in the art will recognize that other variations may exist between a virtual item 170 and its real-world counterpart.

Figure 3:
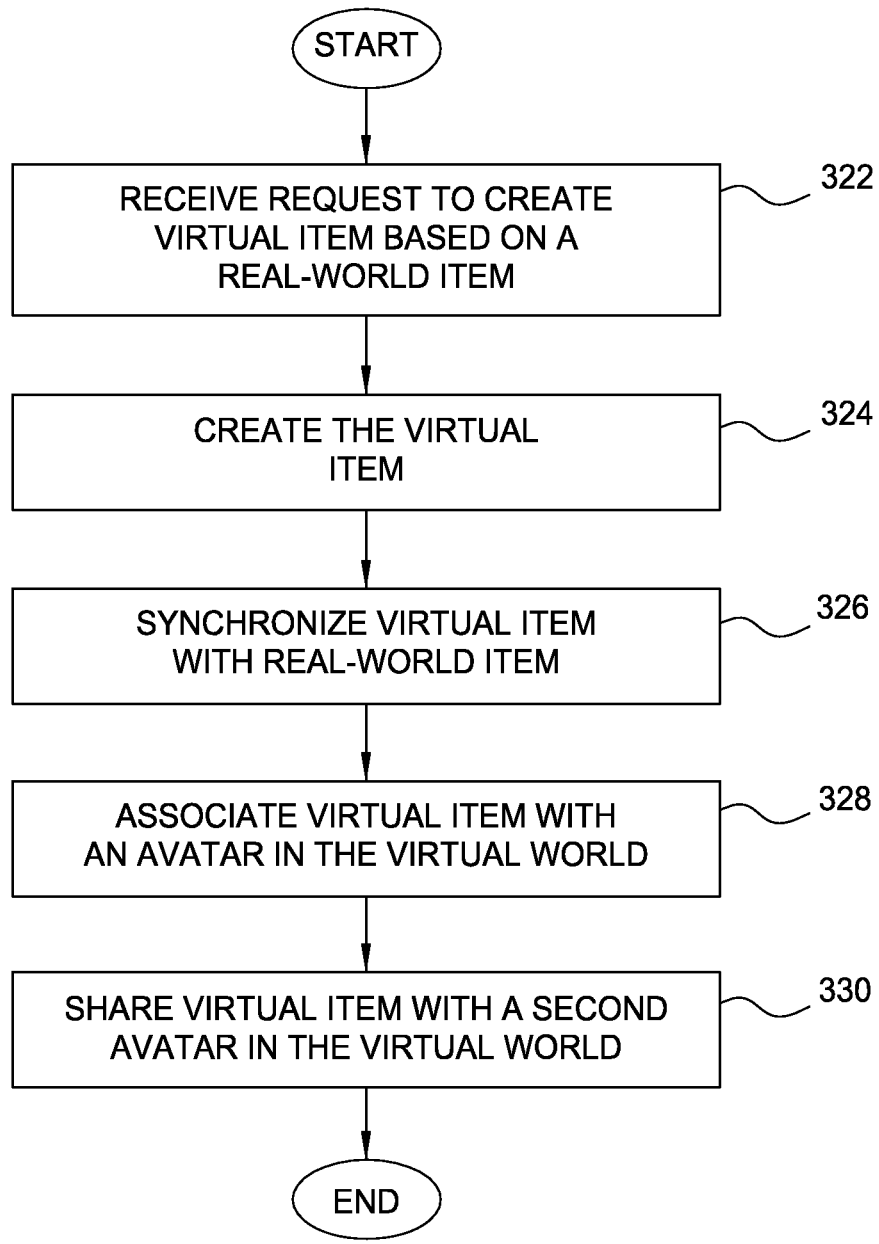
FIG. 3 is a flow diagram illustrating a method of replicating changes between a virtual object and a real object, according to one embodiment of the invention.

FIG. 3 is a flow diagram illustrating a method of replicating changes between a virtual object and a real object, according to one embodiment of the invention. As shown, the method 300 begins at step 322, where the virtual world server application 168 receives a request to create a virtual item 170 based on a real-world item. As discussed above, the real-world item may be digital (e.g., a music file, an eBook, etc.) or physical (e.g., a guitar). Upon receiving the request, the server application 168 creates the virtual item 170 in the virtual world 178 (step 324). As discussed above, the virtual item 170 may take a similar appearance to the real-world item, or may alternatively take a different appearance. The server application 168 then synchronizes the virtual item 170 with the real-world item (step 326). Generally, the synchronization represents that changes will be replicated from one item to its corresponding counterpart. In one embodiment, the synchronization is unilateral synchronization (i.e., changes are replicated in the direction of either physical-to-virtual or virtual-to-physical). In another embodiment, the synchronization is bilateral synchronization, where actions to the physical item are replicated to the virtual item 170, and actions to the virtual item 170 are replicated to the physical item.

Once the virtual item 170 is synchronized with the real-world item, the virtual world server application 168 associates the virtual item 170 with a first avatar in the virtual world 178 (step 328). Thus, for example, the server application 168 may associate the virtual item 178 with a first avatar 172 associated with a user who submitted the request. Upon associating the virtual item 170 with a first avatar, the first avatar shares the virtual item 170 with a second avatar in the virtual world 178 (step 330). Thus, for example, a user may (through the first avatar) share a particular page of a book the user is reading with a second user (through the second avatar). Of course, other real-world items may be shared by using the method 300.

One advantage to the method 300 is that it allows users to share content in a virtual world 178, much as they could do outside the virtual world 178. For instance, just as one person may look over another person's shoulder to see what book the other person is reading, or one person may play a song for another person on a guitar, these interactions may instead take place in a virtual world 178 using the method 300. As such, the method 300 may improve the feel and realism of the virtual world, as it allows for the synchronization and previewing of real-world items in the virtual world.

FIG. 4 is a flow diagram illustrating a method of synchronizing a physical item with a virtual item, according to one embodiment of the invention. As shown, the method 400 begins at step 420, where the virtual world client 130 creates a digital copy 132 based on a physical object. In one embodiment, the digital copy 132 may be a complete copy of the physical item. For example, if the physical item is a home video recording stored on a DVD, the digital copy 132 may be a digital movie file containing the entirety of the home video. In another embodiment, the digital copy 132 may be a partial copy of the physical object. For example, if the physical item is an eBook reader, the digital copy may include only the current page (i.e., the page the user is currently reading in the book) of the book stored on the eBook reader. In one embodiment, where the digital copy is a partial copy of the physical object, the digital copy may be updated based on state changes to the real-world object. For example, if the user turns the page on a physical eBook reader, the page turn may then be replicated to the digital copy, such that the digital copy may contain content from the next page of the book. Once the digital copy 132 is created, the client 130 submits a request to generate a virtual object 170 based on the digital copy 132 (step 422).

In yet another embodiment, the digital copy 132 may be a reference to the physical object. In such an embodiment, when an associated virtual object is loaned out to a friend's avatar, the friend's avatar may be able to view the virtual object only when access to the physical object may be obtained. For example, for a physical DVD, rather than creating a digital copy 132 of the entire contents of the DVD, the digital copy 132 may instead be a reference to the physical DVD. Furthermore, the digital copy 132 may further reference a physical media player, such as the user's physical DVD player. As such, when a corresponding virtual object is created based on the digital copy 132, the virtual object may only be viewable when the physical DVD is inserted into the user's physical DVD player. In this example, if the user then removes the physical DVD from the physical DVD player, the contents of the virtual item will no longer be viewable in the virtual world, until the user reinserts the physical DVD into the physical DVD player. This is advantageous, particularly in situations where the content of the physical DVD is protected by the intellectual property rights of a third party, as no copies of the content are created, and it ensures that the user has and maintains physical possession of the physical DVD in order for the virtual copy to function.

Upon receiving the request, the virtual world server application 168 creates a virtual object based on the digital copy (step 424). The virtual object may take a similar appearance or a different appearance from the physical object. Furthermore, the virtual object may contain all or part of the content of the digital copy. The virtual world server application 168 further synchronizes the virtual object 170 with the digital copy 132 stored on the client system 120 (step 426). As such, any state changes to the virtual object 170 (e.g., turning the page in a book, skipping ahead in a movie, etc.) will be replicated to the digital copy 132 on the client system 120. In one embodiment, the changes may be further replicated to the physical object as well. Additionally, the virtual world client 130 then synchronizes the digital copy 132 with the virtual object 170 in the virtual world server application 168 (step 428). As such, any state changes to the digital copy 132 will be replicated to the virtual item 170. Thus, method 400 shows bidirectional synchronization between the digital copy 132 on the client system 120 and the virtual item 170 on the virtual world system 160.

One advantage to the method 400 is that state changes made in either the virtual world 178 or the real world will be replicated to the corresponding other world. For example, a user may watch a portion of a virtual home video with another user in the virtual world 178, and may wish to resume watching the rest of the video at a later time. By using the method 400, the user's position in the virtual movie may be synchronized to the real-world copy of the movie, such that the user may resume watching the video outside the virtual world at the same position.

Figure 5A:
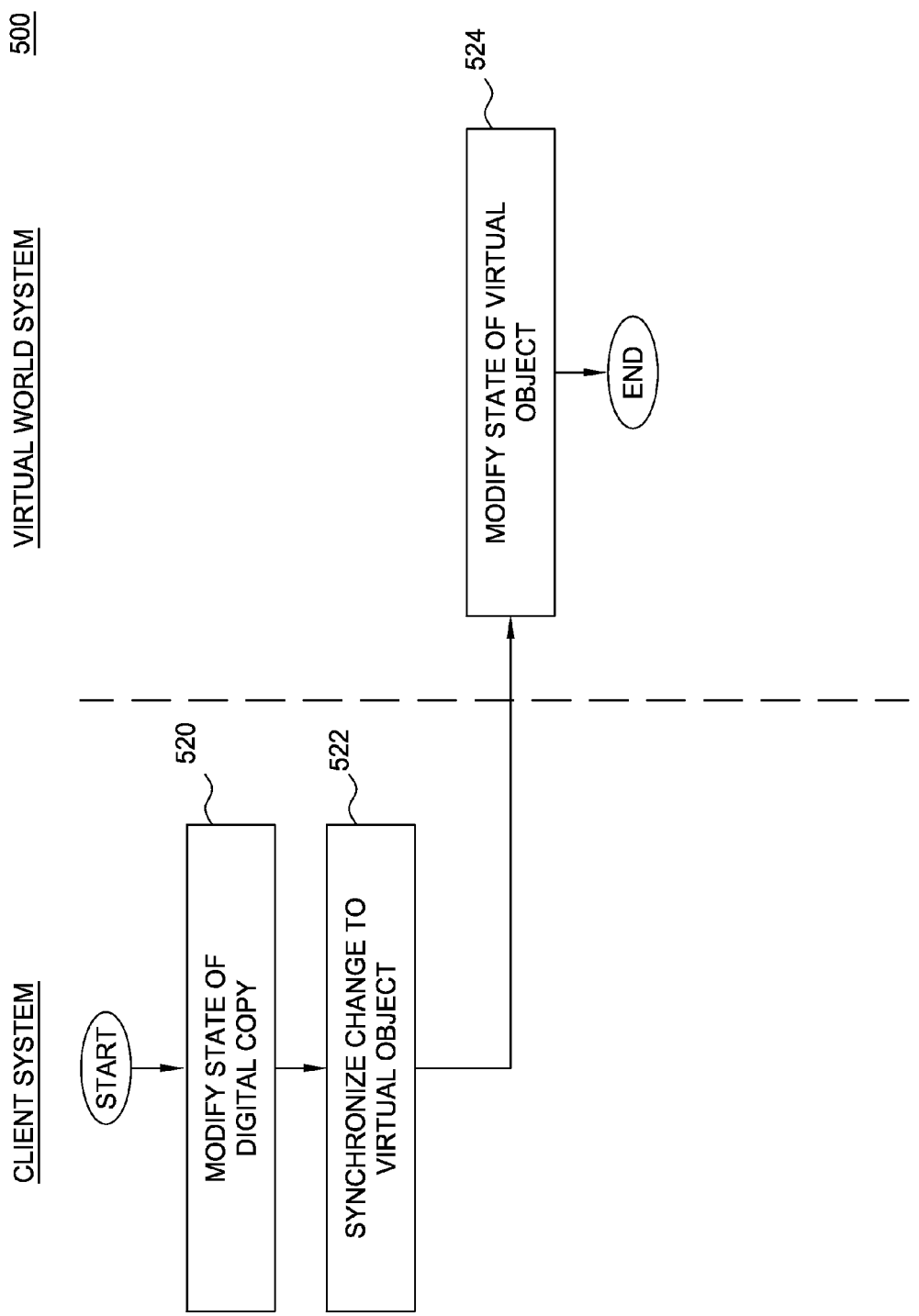

FIGS. 5A-5B are flow diagrams illustrating methods of synchronizing a physical item and a virtual item, according to embodiments of the invention. FIG. 5A is a flow diagram illustrating a method of replicating a state change from a digital item to a virtual item, according to one embodiment of the invention. As shown, the method 500 begins at step 520, where the user of the client system 120 modifies the state of a digital item 132. For example, in an embodiment where the digital item 132 represents a home video stored as a digital movie file, exemplary state changes may include the user beginning playback of the movie, stopping playback of the movie, skipping ahead in the playback, etc. Once the state changes, the virtual world client 130 synchronizes the change with the associated virtual object 170 on the virtual world system 160 (step 522). The virtual world application server 168 then modifies the state of the virtual object 170 accordingly (step 524).

FIG. 5B is a flow diagram illustrating a method of replicating a state change from a virtual item to a digital item, according to one embodiment of the invention. As shown, the method 540 begins at step 560, where the user's avatar 172 in the virtual world 178 modifies the state of the virtual item 170. For example, in an embodiment where the virtual item 170 represents a book, an exemplary state change may be turning the page of the book. Upon detecting that the state of the virtual item 170 has changed, the virtual world server application 168 synchronizes the change to a digital copy 132 associated with the virtual item 170 (step 562). The virtual world client 130 then modifies the state of the digital item 132 accordingly (step 564).

As discussed above, embodiments of the invention may use either unilateral synchronization or bilateral synchronization. Embodiments of the invention that use unilateral synchronization may use either method 500 or 540, or another similar method, in synchronizing the items. Alternatively, embodiments using bilateral synchronization may use both methods 500 and 540. Of course, other methods of synchronizing, both unilaterally and bilaterally, may be used instead.

Figure 6:
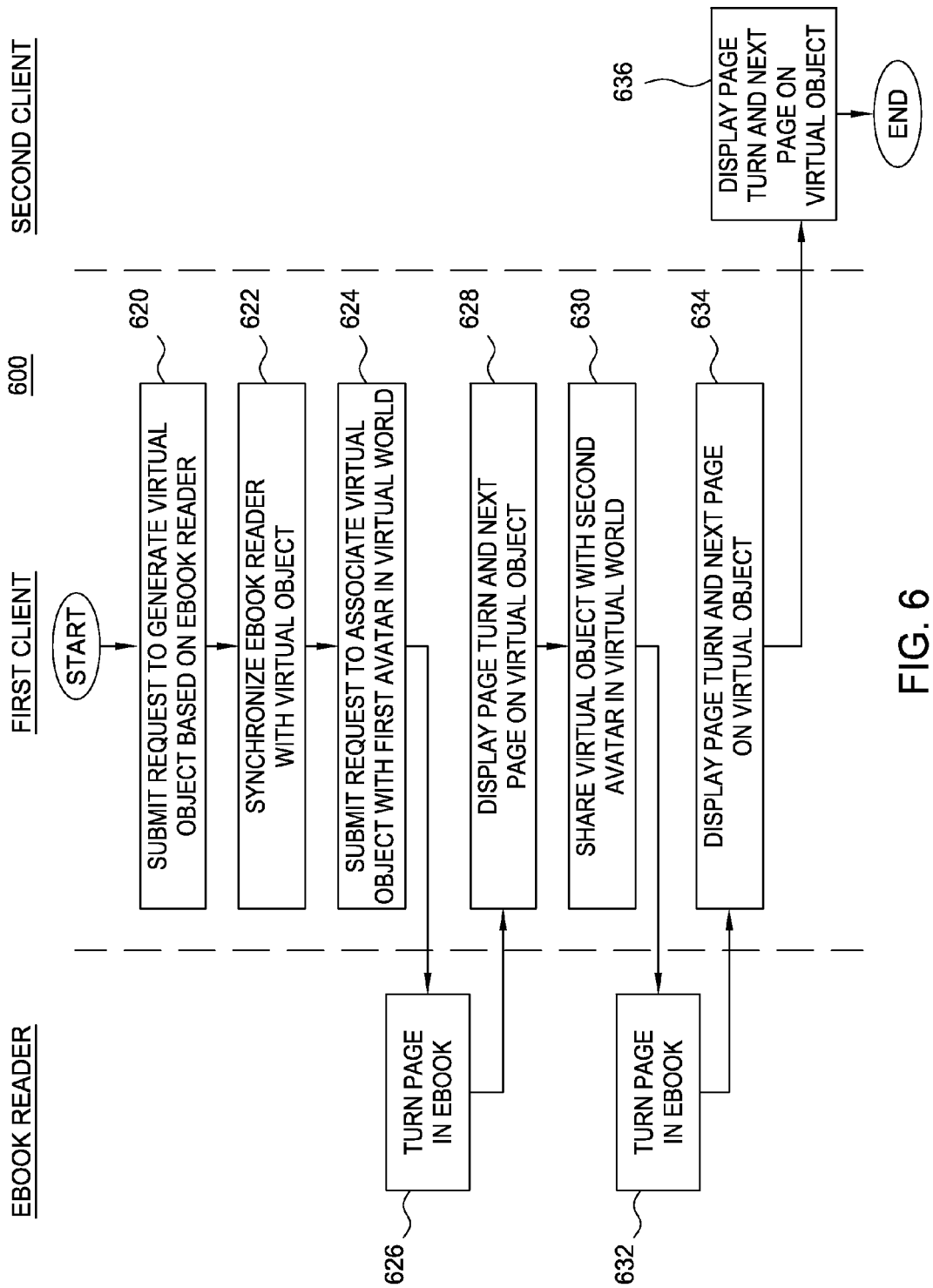
FIG. 6 is a flow diagram illustrating a method of updating a shared virtual item, according to one embodiment of the invention.

FIG. 6 is a flow diagram illustrating a method of updating a shared virtual item, according to one embodiment of the invention. As shown, the method 600 begins at step 620, where a first client (e.g., a first instance of the virtual world client 130) submits a request to generate a virtual object based on an eBook reader. Although the method 600 involves an eBook reader, embodiments of the invention may of course use any other real-world item instead. The first client may include all or part of the content of a book on the eBook reader in the request. For example, the request may include the content of a current page of a book on the eBook reader, or may include the content of all pages of the book on the eBook reader. Once the virtual item is created, the first client synchronizes the eBook reader with the virtual item (step 622). For example, the first client may monitor the status of the eBook reader (e.g., what page of the book the eBook reader is currently displaying). Upon detecting a state change, this change may be replicated to the virtual item in the virtual world. Although the method 600 shows physical-to-virtual synchronization, as discussed above, embodiments of the invention may use either unilateral or bilateral synchronization.

Once the physical eBook reader and the virtual eBook reader are synchronized, the first client submits a request to associate the virtual eBook reader with a first avatar in the virtual world (step 624). In one embodiment, the virtual world server application 168 may automatically associate the virtual item 170 with an avatar associated with the user creating the virtual item 170. In another embodiment, the user may specify the avatar to associate the virtual item 170 with.

As shown, the user then turns the page of the book on the physical eBook reader (step 626). Upon detecting the state change, the virtual world client may replicate the change to the virtual item 170 in the virtual world 178. The virtual world server application 168 then modifies the virtual item 170 to reflect the change in the physical eBook reader. Because virtual item 170 is synchronized with the real-world eBook reader, the first client then displays the user's avatar turning the page of the virtual book in the virtual world 178 (step 628). In one embodiment of the invention, the first client may further display the content on the next page of the virtual book.

In the pictured example, the first avatar then shares the virtual object with a second avatar in the virtual world 178 (step 630). For example, the user associated with the first avatar may wish to show a particularly interesting page of the book on the eBook reader to a second user associated with the second avatar. The user then turns the page of the book on the eBook reader (step 632). Due to the synchronization between the physical eBook reader and the virtual eBook reader, the first client then replicates the state change to the virtual eBook reader in the virtual world. Accordingly, the first client then displays user's avatar turning the page of the virtual book in the virtual world (step 634). The first client may further display the next page of the book on the virtual eBook reader. Additionally, because the virtual eBook reader is shared with the second avatar, the second client also displays the first user's avatar turning the page of the book, and may also display the next page of the book on the virtual eBook reader (step 636).

By using the method 600, the first user is able to use an avatar in the virtual world to share a particular page of an eBook with a second user. Additionally, the first user may simply navigate to the page to show using the physical eBook reader, and the corresponding virtual copy of the book will be updated accordingly. As such, the user may simply take the same actions he would take in the real world to show the page to the second user (e.g., navigating to the particular page of the book on the eBook reader), and the content will be shared with the second user in the virtual world.

As discussed above, embodiments of the invention may place restrictions on a user's ability to share content protected by the intellectual property rights of a third party. For example, in one embodiment of the invention, the user may simply be prohibited from sharing any portion of such content. In another embodiment of the invention, limitations may be placed on the user's ability to share protected content. For example, one embodiment of the invention may limit a user to sharing only a predetermined portion of the protected content (e.g., 30 seconds of an audio file, 5 pages of a book, etc.). Furthermore, in an embodiment where the first user may lend the virtual item to another user's avatar in the virtual world, embodiments of the invention may place restrictions on the first user's ability to access the content while the other avatar has possession of the virtual item. Embodiments of the invention may place such restrictions on both the virtual item (e.g., not allowing the user to view the virtual item while the second user's avatar has possession of the item) and the physical object (e.g., not allowing the user to access the digital copy of the item while the virtual item is on loan).

Furthermore, embodiments of the invention may require other avatars to obtain permission from the avatar associated with a virtual item before they may view the virtual item. For example, a second avatar may request permission from a first avatar to view a virtual item associated with the first avatar. If the first avatar grants permission, the second avatar may then view the contents of the virtual item (e.g., by looking over the first avatar's shoulder in the virtual world to see the contents of the current page of a book). However, in this example, if a third avatar happens by in the virtual world, the third avatar may not view the contents of the virtual item without first obtaining the permission of the first user, even though the second avatar is currently viewing the contents. In one embodiment of the invention, a user may specify a pre-approved list of other avatars who may automatically view virtual items associated with the user's avatar, without having to first request permission. Furthermore, in another embodiment of the invention, this list may be combined with an existing list of users in the virtual world (e.g., a buddy list). These access restrictions are advantageous in situations where it is desirable to restrict the number of people who may view the content, such as when the content is considered to be private in nature, or when the content is protected by the intellectual property rights of a third party.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of communicating content, the method comprising:
   creating a virtual object in a virtual world based on a real-world object existing outside the virtual world;
   associating the virtual object with a first avatar in the virtual world;
   synchronizing, by operation of one or more computer processors, the virtual object with the real-world object such that one or more changes to one of the objects are reflected in the other object, wherein said synchronizing comprises:
   receiving a request from a user associated with the first avatar to view a current viewing position of the first avatar in the virtual object, and
   in response to receiving the request, updating a state of the real-world object based on the current viewing position;
   and transferring possession of the virtual object from the first avatar to a second avatar in the virtual world.

2. The method of claim 1, further comprising:
   disabling use of the real-world object until the first avatar regains possession of the virtual object.

3. The method of claim 1, further comprising:
   receiving a request to restore possession of the virtual object to the first avatar; and
   responsive to the request, transferring possession of the virtual object from the second avatar to the first avatar.

4. The method of claim 1, wherein synchronizing the virtual object with the real-world object further comprises:
   detecting a state change for the virtual object; and
   updating a state of the real-world object based on an updated state of the virtual object.

5. The method of claim 1, wherein synchronizing the virtual object with the real-world object further comprises:
detecting a state change for the real-world object; and
updating a state of the virtual object based on an updated state of the real-world object.

6. The method of claim 1, further comprising:
making at least one portion of the virtual object viewable by a user associated with the second avatar, wherein the at least one portion of the virtual object is viewable by the user associated with the second avatar only for a predetermined period of time.

7. The method of claim 1, further comprising:
requesting permission from the first avatar to share the virtual object with the second avatar; and
upon receiving the permission making at least a portion of the virtual object viewable by the second avatar.

8. The method of claim 1, further comprising:
requesting permission from the first avatar to share the virtual object with the second avatar;
determining whether an identifier associated with the second avatar is included on a list of pre-approved avatars; and
upon determining that the identifier is on the list, making at least a portion of the virtual object viewable by the second avatar.

9. The method of claim 1, further comprising:
determining whether the user associated with the first avatar has possession of the real-world object; and
upon determining that the user associated with the first avatar has possession, making at least a portion of the virtual object viewable by a user associated with the second avatar.

10. The method of claim 1, wherein the virtual object is viewable by the second avatar only when a user associated with the second avatar has access to the real-world object.

11. A system comprising:
a computer processor; and
a memory containing a program that, when executed on the computer processor, performs an operation for communicating content, the operation comprising:
creating a virtual object in a virtual world based on a real-world object existing outside the virtual world;
associating the virtual object with a first avatar in the virtual world;
synchronizing the virtual object with the real-world object such that one or more changes to one of the objects are reflected in the other object,
wherein said synchronizing comprises:
receiving a request from a user associated with the first avatar to view a current viewing position of the first avatar in the virtual object, and
in response to receiving the request, updating a state of the real-world object based on the current viewing position;
transferring possession of the virtual object from the first avatar to a second avatar in the virtual world.

12. The system of claim 11, the operation further comprising:
disabling use of the real-world object until the first avatar regains possession of the virtual object.

13. The system of claim 11, the operation further comprising:
receiving a request to restore possession of the virtual object to the first avatar;
and responsive to the request, transferring possession of the virtual object from the second avatar to the first avatar.

14. The system of claim 11, wherein synchronizing the virtual object with the real-world object further comprises:
detecting a state change for the virtual object; and
updating a state of the real-world object based on an updated state of the virtual object.

15. The system of claim 11, wherein synchronizing the virtual object with the real-world object further comprises:
detecting a state change for the real-world object; and
updating a state of the virtual object based on an updated state of the real-world object.

16. The system of claim 11, the operation further comprising:
making at least one portion of the virtual object viewable by a user associated with the second avatar, wherein the at least one portion of the virtual object is viewable by the user associated with the second avatar only for a predetermined period of time.

17. The system of claim 11, wherein the virtual object is viewable by the second avatar only when a user associated with the second avatar has access to the real-world object.

18. A computer program product for communicating content, comprising:
computer readable storage device having computer readable program code embodied therewith, the computer readable program code comprising:
computer readable program code to create a virtual object in the virtual world based on a real-world object existing outside the virtual world;
computer readable program code to synchronize the virtual object with the real- world object such that one or more changes to one of the objects are reflected in the other object, wherein the computer readable code to synchronize comprises:
computer readable program code to receive a request from a user associated with the first avatar to view a current viewing position of the first avatar in the virtual object, and
computer readable program code to update a state of the real-world object based on the current viewing position in response to receiving the request;
computer readable program code to associate the virtual object with a first avatar in the virtual world; and
computer readable program code to transfer possession of the virtual object from the first avatar to a second avatar in the virtual world.

19. The computer program product of claim 18, further comprising:
computer readable program code to make at least a portion of the virtual object viewable by the second avatar upon receiving permission from the first avatar to share the virtual object with the second avatar.

20. The computer program product of claim 18, wherein the virtual object is viewable by the second avatar only when a user associated with the second avatar has access to the real-world object.

* * * * *